UNITED STATES PATENT OFFICE.

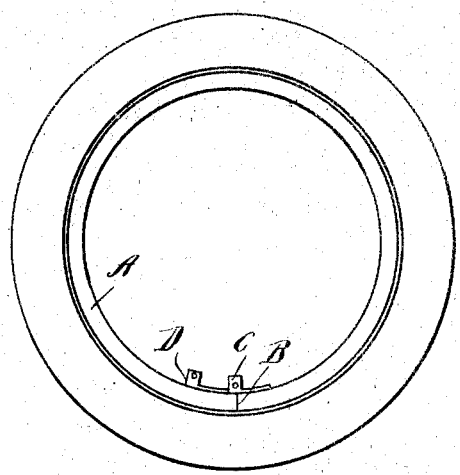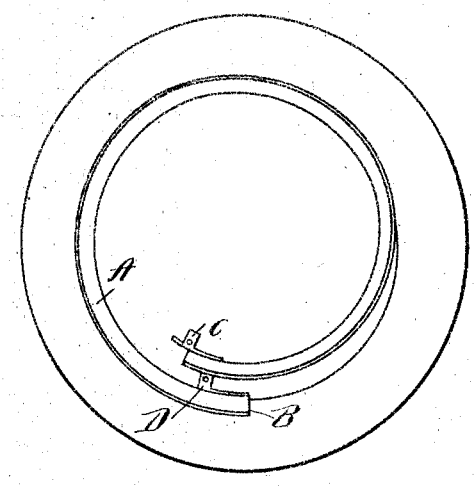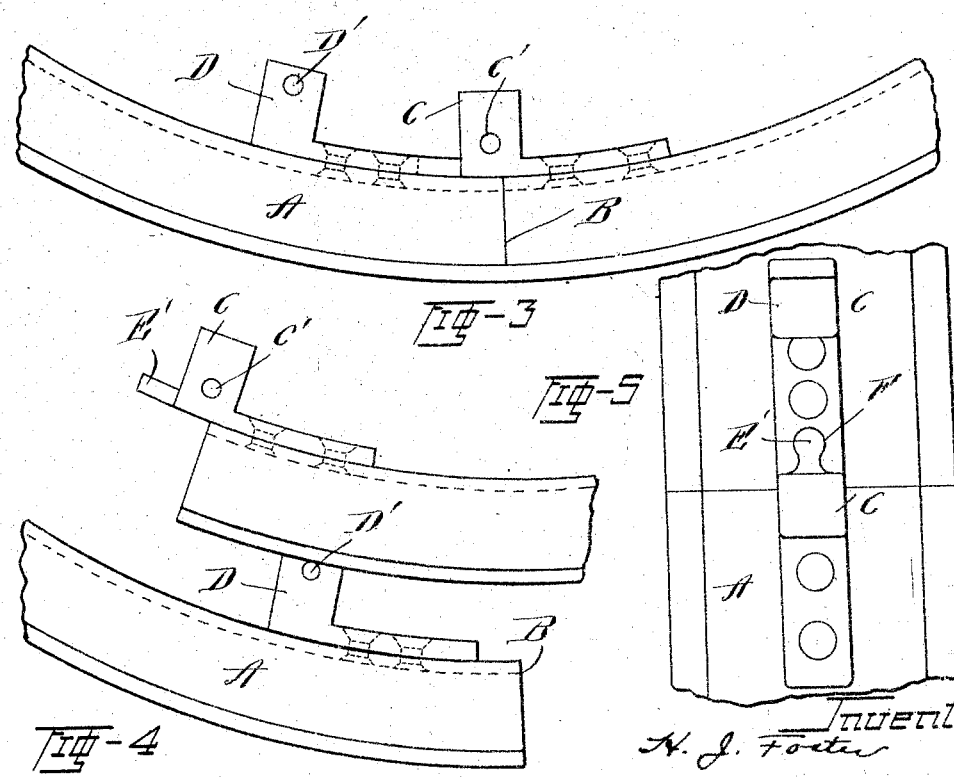

HENRY J. FOSTER, OF CLEVELAND, OHIO, ASSIGNOR TO THE HYDRAULIC PRESSED STEEL COMPANY, OF CLEVELAND, OHIO, A CORPORATION OF OHIO.

RIM-FASTENING MEANS.

1,341,118.  Specification of Letters Patent.  Patented May 25, 1920.

Application filed July 31, 1918. Serial No. 247,474.

*To all whom it may concern:*

Be it known that I, HENRY J. FOSTER, a citizen of the United States, residing at Cleveland, in the county of Cuyahoga and State of Ohio, have invented a certain new and useful Improvement in Rim-Fastening Means, of which the following is a full, clear, and exact description, reference being had to the accompanying drawings.

This invention relates generally to a one piece transplit tire carrying rim and it has for its object to provide a novel means for fastening the ends together in order to hold them against separation or movement when the rim is fastened upon the wheel body.

With this object in view the invention consists in the novel features of construction hereinafter fully described and pointed out in the claims.

In the drawings forming a part of this specification Figure 1 is a view of a tire carrying rim provided with my improvement, the rim being closed; Fig. 2 is a similar view, the rim being opened or contracted; Fig. 3 is an enlarged detail view showing the ends of the rim closed and locked together; Fig. 4 is a similar view showing the rim ends opened and the rim contracted; and Fig. 5 is a detail plan view of the rim connecting means, the parts being interlocked.

Referring to the drawings, A indicates a tire-carrying rim divided at one point B, and this rim may be of any type.

To one end of the rim is attached a block or lug C, said lug being rigidly connected to the rim end and projecting slightly beyond the same.

A lug D is connected to the opposite end of the rim, this lug being set back a slight distance as shown. The lug C has a transverse bore or opening C', and the lug D has a transverse bore or opening D', the bore or opening D' being preferably arranged closer to the center of the rim than the bore or opening C'. These transverse bores or openings D' and C' are intended to receive the transverse pins or studs of a rim operating tool, by means of which the rim is opened or closed as desired.

The lug or member C has a tongue E projecting therefrom which is adapted to enter a recess F produced in the base or plate-like portion of the lug D. The tongue E has an enlarged or expanded head E', and the recess F is correspondingly shaped so that when the tongue is brought into engagement with the recess the members C and D will be locked together and held against separation, and consequently the rim ends will also be held in their proper closed position and all tendency to separate when being fastened upon the wheel body will be obviated.

It will of course be understood that the lugs C and D with their interlocking portions E and F can be variously formed, without departing from the broad principles of the invention.

Having thus described my invention, what I claim is:

The combination with a one-piece transplit tire carrying rim, of plates attached to the ends of said rim and provided with driving lugs, the meeting ends of said plates being shaped to interlock.

In testimony whereof I hereunto affix my signature.

HENRY J. FOSTER.